US012498441B2

United States Patent
Keshipeddy

(10) Patent No.: US 12,498,441 B2
(45) Date of Patent: Dec. 16, 2025

(54) VEHICULAR SOUND PROCESSING SYSTEM WITH ENHANCED RECOGNITION OF AUDIBLE ALERTS FROM OTHER VEHICLES

(71) Applicant: Magna Electronics Inc., Auburn Hills, MI (US)

(72) Inventor: Prathyush Kumar Keshipeddy, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 136 days.

(21) Appl. No.: 17/818,495

(22) Filed: Aug. 9, 2022

(65) Prior Publication Data

US 2023/0048800 A1    Feb. 16, 2023

Related U.S. Application Data

(60) Provisional application No. 63/260,160, filed on Aug. 11, 2021.

(51) Int. Cl.
  *G01S 3/80* (2006.01)
  *B60Q 9/00* (2006.01)
  *H04R 1/40* (2006.01)

(52) U.S. Cl.
  CPC ............... *G01S 3/80* (2013.01); *B60Q 9/00* (2013.01); *H04R 1/406* (2013.01); *H04R 2430/01* (2013.01)

(58) Field of Classification Search
  CPC .......... H04N 7/18; H04N 23/11; H04N 23/56; H04N 23/63; H04N 23/661; H04N 23/74; H04N 25/76; H04N 7/183; H04N 7/181; H04N 23/90; H04N 5/33; G10K 2210/1282; G10K 11/346; H04R 2499/13; H04R 2227/009; H04R 2420/03; H04R 27/00; H04R 3/005; H04R 3/12; G10L 21/028; G10L 25/48; G10L 25/51; G10L 25/63; G10L 25/78; G10L 2021/02087; G10L 2021/02166; G10L 21/0208; H04M 1/6075; H04M 1/6091; H04M 2250/02; H04M 2250/74; H04S 7/302
  USPC .......................................... 381/92, 56–59, 86
  See application file for complete search history.

(56) References Cited

U.S. PATENT DOCUMENTS

| | | | |
|---|---|---|---|
| 4,930,742 | A | 6/1990 | Schofield et al. |
| 4,956,866 | A | 9/1990 | Bernstein et al. |
| 4,959,865 | A | 9/1990 | Stettiner et al. |
| 4,975,966 | A | 12/1990 | Sapiejewski |
| 5,329,593 | A | 7/1994 | Lazzeroni et al. |
| 5,495,242 | A | 2/1996 | Kick et al. |
| 5,671,996 | A | 9/1997 | Bos et al. |

(Continued)

*Primary Examiner* — Lun-See Lao
(74) *Attorney, Agent, or Firm* — HONIGMAN LLP

(57) ABSTRACT

A vehicular alert system a microphone disposed at a vehicle. The vehicular alert system, responsive to processing of audio data captured by the microphone, determines an audio event occurring external of the vehicle. The vehicular alert system, responsive to determination that the audio event occurred external of the vehicle, generates an alert for an occupant of the vehicle. The alert includes vibration of a seat of the vehicle and the alert includes a visual alert at a display screen disposed within the vehicle and viewable by a driver of the vehicle. The visual alert indicates direction toward the determined audio event.

12 Claims, 7 Drawing Sheets

(56) References Cited

U.S. PATENT DOCUMENTS

| | | |
|---|---|---|
| 5,703,957 A | 12/1997 | McAteer |
| 5,820,245 A | 10/1998 | Desmond et al. |
| 5,828,012 A | 10/1998 | Repolle et al. |
| 5,850,016 A | 12/1998 | Jung et al. |
| 5,877,897 A | 3/1999 | Schofield et al. |
| 5,878,147 A | 3/1999 | Killion et al. |
| 5,894,279 A | 4/1999 | Rose et al. |
| 5,979,586 A | 11/1999 | Farmer et al. |
| 6,166,625 A | 12/2000 | Teowee et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,329,925 B1 | 12/2001 | Skiver et al. |
| 6,362,749 B1 | 3/2002 | Brill |
| 6,363,156 B1 | 3/2002 | Roddy |
| 6,366,213 B2 | 4/2002 | DeLine et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,485,081 B1 | 11/2002 | Bingle et al. |
| 6,501,387 B2 | 12/2002 | Skiver et al. |
| 6,614,911 B1 | 9/2003 | Watson et al. |
| 6,648,477 B2 | 11/2003 | Hutzel et al. |
| 6,690,268 B2 | 2/2004 | Schofield et al. |
| 6,717,524 B2 | 4/2004 | DeLine et al. |
| 6,774,356 B2 | 8/2004 | Heslin et al. |
| 6,798,890 B2 | 9/2004 | Killion et al. |
| 6,882,734 B2 | 4/2005 | Watson et al. |
| 6,906,632 B2 | 6/2005 | DeLine et al. |
| 6,980,092 B2 | 12/2005 | Turnbull et al. |
| 6,980,663 B1 | 12/2005 | Linhard |
| 7,038,577 B2 | 5/2006 | Pawlicki et al. |
| 7,061,402 B1 * | 6/2006 | Lawson ............... G08G 1/0965 |
| | | 340/901 |
| 7,245,232 B1 | 7/2007 | Caouette, Sr. |
| 7,308,341 B2 | 12/2007 | Schofield et al. |
| 7,415,116 B1 | 8/2008 | Fels |
| 7,657,052 B2 | 2/2010 | Larson et al. |
| 7,720,580 B2 | 5/2010 | Higgins-Luthman |
| 7,791,499 B2 | 9/2010 | Mohan et al. |
| 7,855,755 B2 | 12/2010 | Weller et al. |
| 7,914,187 B2 | 3/2011 | Higgins-Luthman et al. |
| 8,094,040 B1 | 1/2012 | Cornett et al. |
| 8,258,932 B2 | 9/2012 | Wahlstrom |
| 8,275,145 B2 | 9/2012 | Buck et al. |
| 8,319,620 B2 | 11/2012 | Usher et al. |
| 8,355,521 B2 | 1/2013 | Larson et al. |
| 8,824,697 B2 | 9/2014 | Christoph |
| 9,278,689 B1 | 3/2016 | Delp |
| 9,397,630 B2 | 7/2016 | Wang et al. |
| 9,405,120 B2 | 8/2016 | Graf et al. |
| 9,417,838 B2 | 8/2016 | Baalu et al. |
| 9,576,208 B2 | 2/2017 | Agnew et al. |
| 9,800,983 B2 | 10/2017 | Wacquant et al. |
| 10,017,114 B2 | 7/2018 | Bongwald |
| 10,065,574 B2 | 9/2018 | Tiryaki |
| 10,071,687 B2 | 9/2018 | Ihlenburg et al. |
| 10,099,614 B2 | 10/2018 | Diessner |
| 10,264,375 B2 | 4/2019 | Wacquant et al. |
| 10,536,791 B2 * | 1/2020 | Wacquant ............. H04R 3/005 |
| 11,639,134 B1 | 5/2023 | Huizen et al. |
| 11,780,372 B2 | 10/2023 | Sobecki et al. |
| 11,851,080 B2 | 12/2023 | Sobecki et al. |
| 2002/0032510 A1 | 3/2002 | Turnbull et al. |
| 2002/0080021 A1 | 6/2002 | Skiver et al. |
| 2002/0110255 A1 | 8/2002 | Killion et al. |
| 2002/0110256 A1 | 8/2002 | Watson et al. |
| 2003/0117728 A1 * | 6/2003 | Hutzel ................ B60R 11/0217 |
| | | 359/850 |
| 2004/0170286 A1 | 9/2004 | Durach et al. |
| 2005/0074131 A1 | 4/2005 | Mc Call et al. |
| 2005/0249379 A1 | 11/2005 | Yoshimura |
| 2006/0023892 A1 | 2/2006 | Schultz |
| 2011/0215915 A1 | 9/2011 | Lee et al. |
| 2012/0069188 A1 | 3/2012 | Ohno et al. |
| 2012/0121113 A1 | 5/2012 | Li |
| 2012/0136559 A1 | 5/2012 | Rothschild |
| 2012/0230504 A1 | 9/2012 | Kuroda |
| 2013/0070928 A1 * | 3/2013 | Ellis ....................... H04R 25/30 |
| | | 381/56 |
| 2013/0223643 A1 | 8/2013 | Sato et al. |
| 2013/0286193 A1 | 10/2013 | Pflug |
| 2014/0160284 A1 | 6/2014 | Achenbach et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0137998 A1 | 5/2015 | Marti et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0355125 A1 | 12/2016 | Herbert |
| 2017/0217367 A1 | 8/2017 | Pflug et al. |
| 2017/0274906 A1 | 9/2017 | Hassan et al. |
| 2018/0211528 A1 | 7/2018 | Seifert |
| 2018/0222414 A1 | 8/2018 | Ihlenburg et al. |
| 2018/0231976 A1 | 8/2018 | Singh |
| 2020/0143560 A1 | 5/2020 | Lu et al. |
| 2020/0154220 A1 | 5/2020 | Wacquant et al. |
| 2020/0202151 A1 | 6/2020 | Wacquant |
| 2020/0320320 A1 | 10/2020 | Lynam |
| 2021/0291739 A1 | 9/2021 | Kasarla et al. |
| 2021/0323473 A1 | 10/2021 | Peterson et al. |
| 2022/0111857 A1 | 4/2022 | Kulkarni |
| 2022/0254132 A1 | 8/2022 | Rother |
| 2022/0377219 A1 | 11/2022 | Conger et al. |

* cited by examiner

VEHICULAR SOUND PROCESSING SYSTEM WITH ENHANCED RECOGNITION OF AUDIBLE ALERTS FROM OTHER VEHICLES

CROSS REFERENCE TO RELATED APPLICATION

The present application claims the filing benefits of U.S. provisional application Ser. No. 63/260,160, filed Aug. 11, 2021, which is hereby incorporated herein by reference in its entirety.

FIELD OF THE INVENTION

The present invention relates generally to a vehicle alert system for a vehicle and, more particularly, to a vehicle alert system that utilizes one or more sensors at a vehicle.

BACKGROUND OF THE INVENTION

Use of microphones in vehicle sound systems is common and known. Examples of such known systems are described in U.S. Pat. Nos. 7,657,052; 6,420,975; 6,278,377, and 6,243,003, which are hereby incorporated herein by reference in their entireties.

SUMMARY OF THE INVENTION

A vehicular alert system a microphone disposed at a vehicle equipped with the vehicular alert system and sensing exterior of the vehicle. The microphone captures audio data. The system includes an electronic control unit (ECU) with electronic circuitry and associated software. The electronic circuitry of the ECU includes a processor for processing audio data captured by the microphone. The vehicular alert system, responsive to processing by the processor of audio data captured by the microphone, determines an audio event occurring external of the vehicle. The vehicular alert system, responsive to determination the audio event occurred external of the vehicle, generates an alert for an occupant of the vehicle. The alert includes vibration of a seat of the vehicle and a visual alert at a display screen disposed within the vehicle and viewable by a driver of the vehicle. The visual alert indicates direction toward the determined audio event.

These and other objects, advantages, purposes and features of the present invention will become apparent upon review of the following specification in conjunction with the drawings.

DESCRIPTION OF THE PREFERRED EMBODIMENTS

Figure 1:
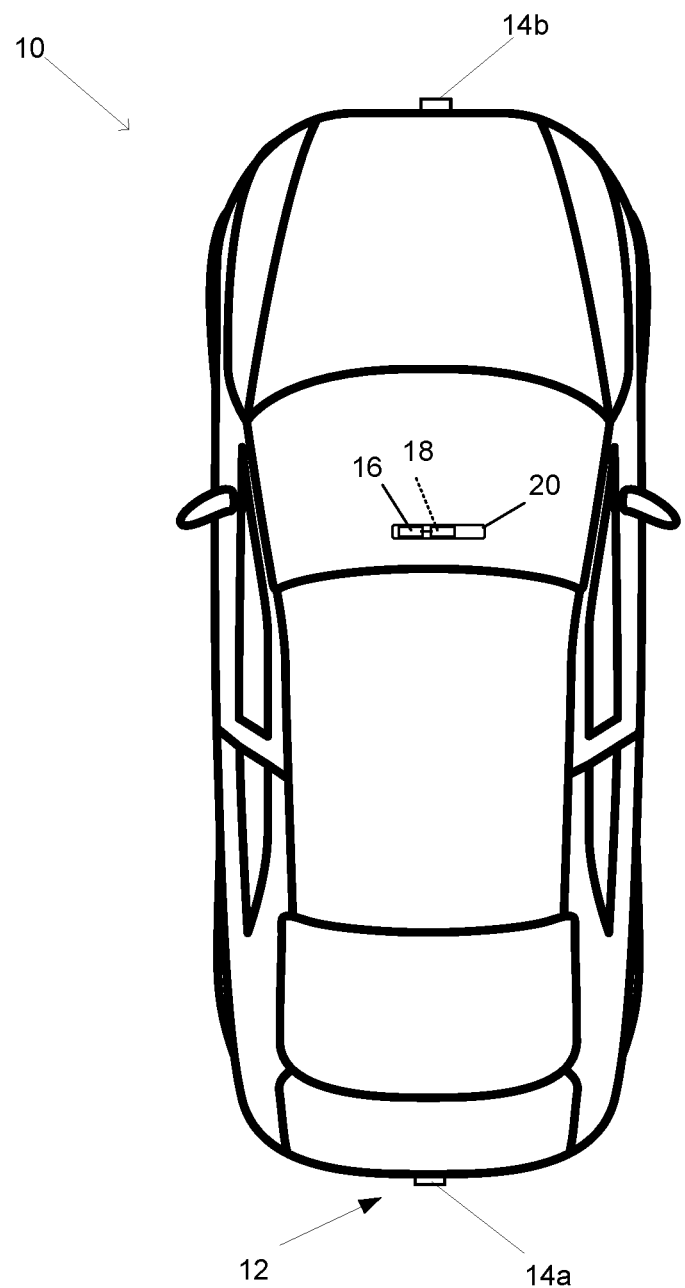
FIG. 1 is a plan view of a vehicle with an alert system that incorporates sensors.

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an alert system 12 that includes at least one microphone, such as a rear microphone 14a and/or a forward microphone 14b at the front (or at the windshield) of the vehicle, which captures audio data external of the vehicle. The microphone(s) 14 may be disposed at a bumper, a trunk lid, a hood, one or more side mirrors, a roof, or any other appropriate location on the vehicle. The alert system 12 includes a control or electronic control unit (ECU) 18 having electronic circuitry and associated software, with the electronic circuitry including a data processor that is operable to process sensor data captured by the microphones or other sensors (e.g., cameras), whereby the ECU may detect or determine external audio events (e.g., sirens, vehicle horns, etc.). The data transfer or signal communication from the camera to the ECU may comprise any suitable data or communication link, such as a vehicle network bus or the like of the equipped vehicle.

For various reasons it is not uncommon for a driver or other occupant of a vehicle to be unable to hear what is happening outside of the vehicle. For example, the driver may be listening to loud music, the driver may have poor hearing, the driver may have blocked hearing (e.g., headphones, ear plugs, etc.), and/or the vehicle may have significant soundproofing. This can lead to the driver being unable to hear important external audio events such as sirens (e.g., for ambulances, fire trucks, police cars, etc.), vehicle horns, etc. If the driver also does not receive any visual cues, the driver may fail to properly react to sounds (e.g., slow down, pull over, take evasive action, etc.).

Figure 2:
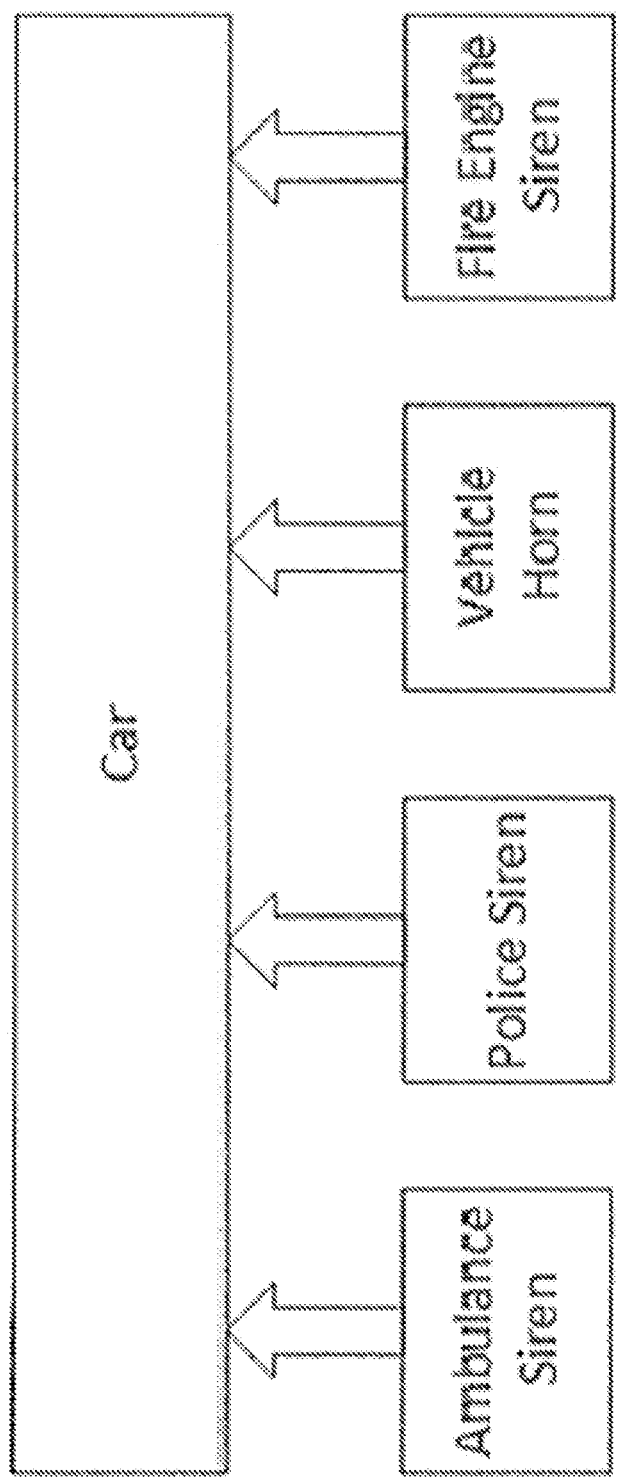
FIG. 2 is a schematic view of external audio events received by a vehicle.
Figure 3:
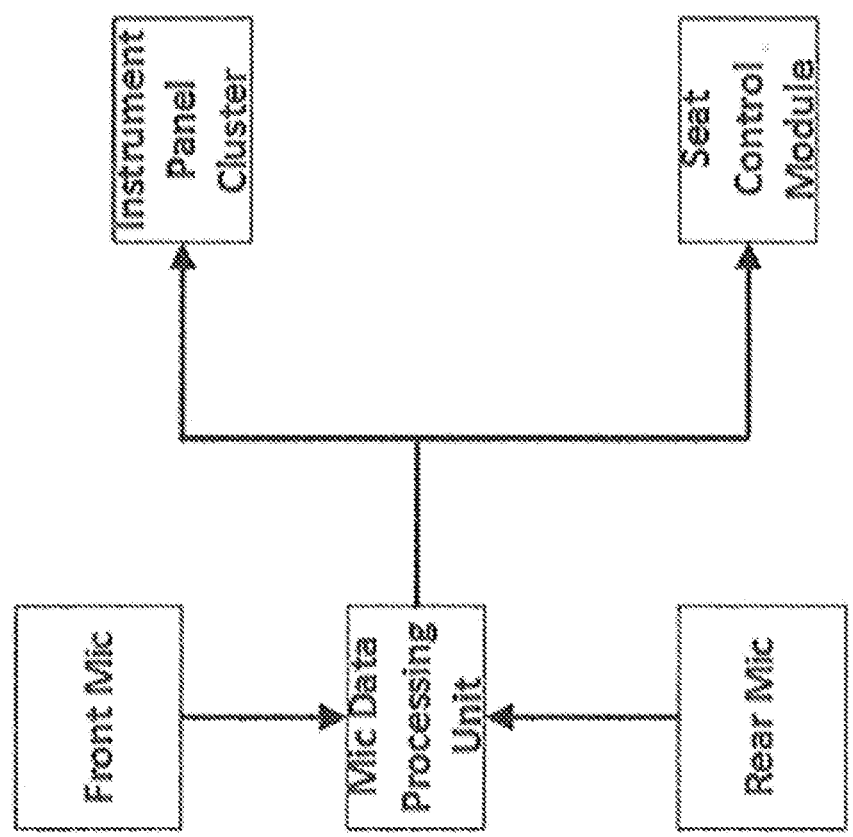
FIG. 3 is a block diagram of the alert system of FIG. 1.
Figure 4:
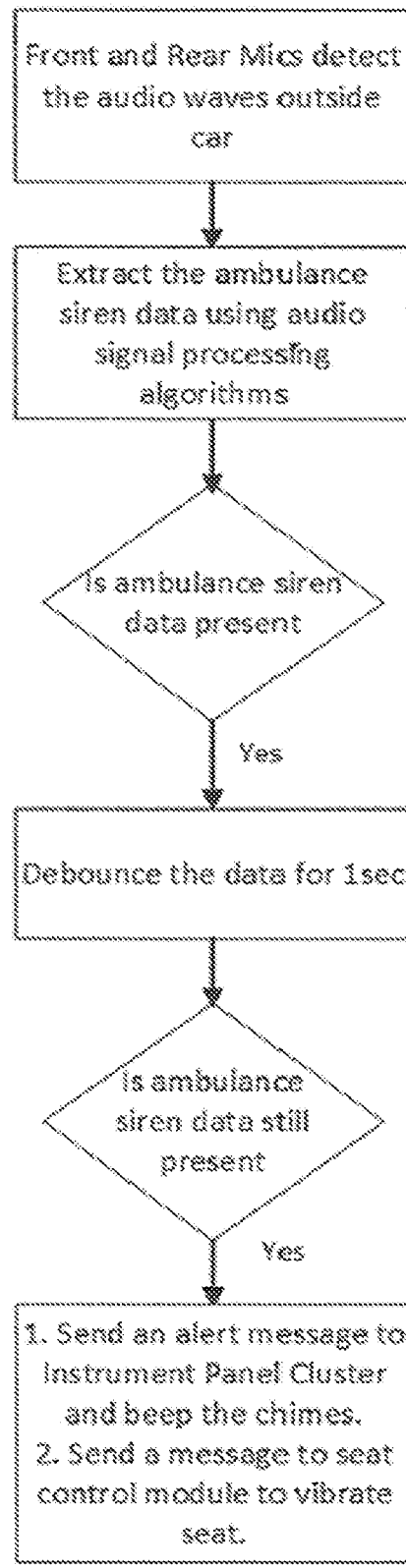
FIGS. 4-7 are flowcharts for alerting an occupant of a vehicle of an audio event using the alert system of FIG. 1.
Figure 5:
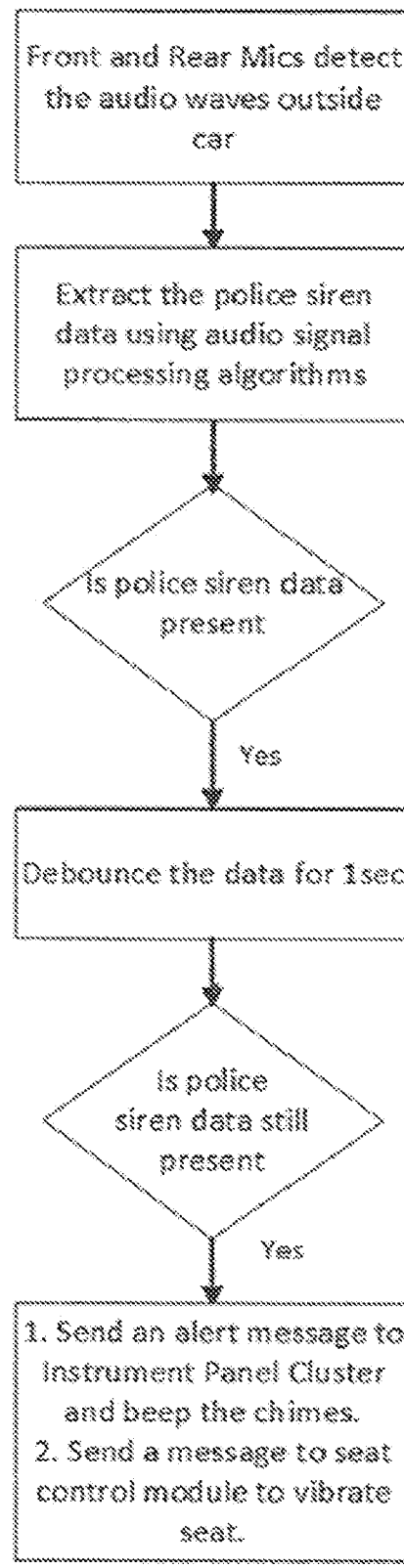
Figure 6:
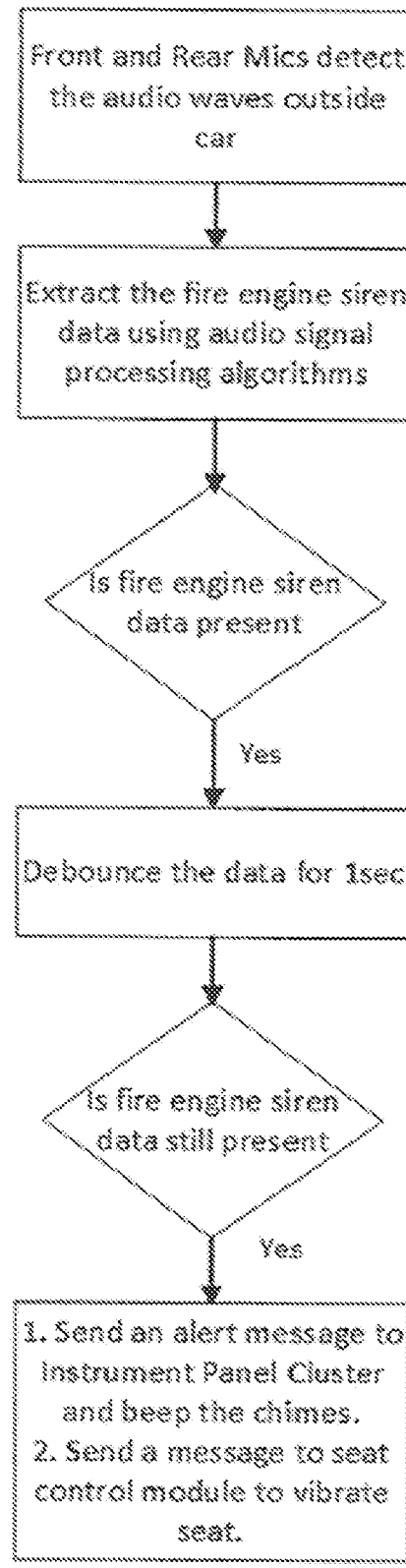
Figure 7:
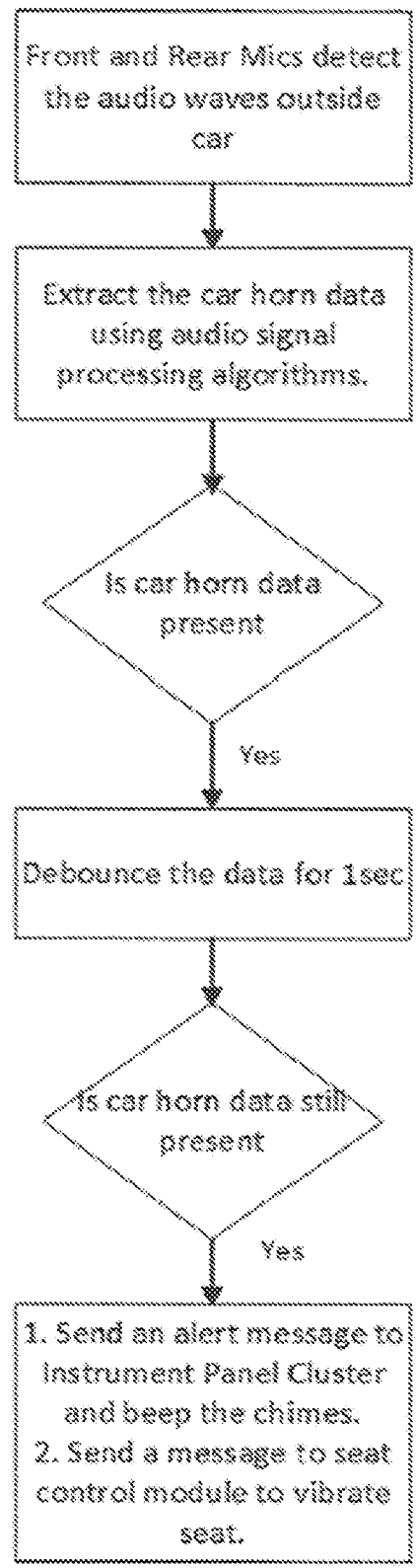

Referring now to FIGS. 2 and 3, implementations herein include an alert system that includes an ECU tor other control or processor that receives sensor data from one or more sensors of the vehicle (e.g., cameras, microphones, etc.) to detect external sound sources such as sirens (e.g., ambulances, police cars, fire trucks, etc.) and vehicle horns. The alert system alerts the driver via, for example, a visual display or haptic feedback. For example, the system may display an alert on a display disposed within the vehicle, play an audible alert over a speaker system of the vehicle, and/or vibrate the driver's seat or steering wheel. The system may control one or more aspects of the vehicle when providing the alert. For example, the system may mute or otherwise reduce a volume of an infotainment or entertainment system of the vehicle.

Optionally, the system includes one or more microphones, such as a first microphone disposed at or near the front of the vehicle for capturing audio data associated with audio sources in front/to the sides of the vehicle and a second microphone disposed at or near the rear of vehicle for capturing audio data associated with audio sources behind/to the sides of the vehicle. The system may include additional microphones (e.g., microphones disposed at sides of the vehicle, multiple microphones at the front of the vehicle, multiple microphones at the rear of the vehicle, etc.). The microphone(s) may provide audio data to a microphone data processing unit (e.g., an ECU or other control) for audio processing. The ECU, upon detection of an audio event, may send an alert to an instrument panel cluster and/or seat control module.

The system may use multiple microphones to determine or estimate a direction of the source of the siren/horn. That is, using multiple microphones and/or other sensors (e.g., cameras), the system may perform sound localization, such as 3D sound localization. For example, the system determines a direction based on a time and/or volume each microphone detects an audio event. In these examples, the alert may indicate a direction of the source of the siren/horn. For example, when the system detects a siren behind the vehicle, the system may display an alert on a display of the vehicle that indicates that an audio source has been detected behind the vehicle and that may indicate a direction toward the detected audio source (e.g., via an arrow or other indicator, text, etc.). For example, the alert may comprise an electronically generated graphic overlay that is overlayed at a display screen (e.g., a video display screen operable to display video images derived from image data captured by one or more exterior viewing cameras of the vehicle) to indicate the direction toward the detected audio source.

Referring now to FIGS. 4-7, exemplary flowcharts for the alert system each include a front and/or a rear microphone detecting audio waves outside of a vehicle equipped with the alert system. Using audio signal processing algorithms, an ECU extracts relevant audio data (e.g., an ambulance siren (FIG. 4), a police siren (FIG. 5), a fire engine siren (FIG. 6), and/or a vehicle horn (FIG. 7)). When the relevant audio data is present (e.g., the ECU detects, in the audio data from the microphones, a predetermined audio event), the alert system may debounce the audio data for a predetermined period of time (e.g., two seconds or less, one second or less, half a second or less, etc.). When the audio event is still present after the debounce period, the ECU may send an alert to an instrument panel cluster (e.g., to visually alert the driver via a display) and/or send the alert to a seat control module to vibrate the seat.

Optionally, the system may determine that audio data should trigger an alert when the audio data exceeds a volume threshold so that sirens/horns sufficiently far from the vehicle do not generate alerts. The volume threshold may be configurable by the user. The volume threshold may be dependent on various conditions (e.g., environmental conditions, vehicle speed, vehicle location, etc.). The system may suppress alerts in other scenarios, such as when the system determines that the source of the siren/horn is unlikely to impact the equipped vehicle (e.g., the source of the siren is a vehicle on another road that does not intersect with the road the equipped vehicle is traveling along). The system may use other sensors (e.g., cameras) to confirm an alert or to suppress an alert. For example, the system may confirm the source of the audio event using image data captured by a camera prior to generating the alert.

Thus, the alert system provides an effective means to alert an occupant of a vehicle to external audio events that the occupant otherwise may fail to react to (e.g., due to a failure to hear the external audio events). The system may use one or more microphones to capture audio data of external audio events and provide visual and/or haptic alerts to the driver or other occupants. The microphones may be integrated into other sensors (e.g., cameras). The system may use other sensors such as a camera to confirm or otherwise verify the source or direction of the external audio events. The system may incorporate aspects of audio detection described in U.S. Publication Nos. US-2018-0211528 and/or US-2020-0154220, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466;

7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2022-0111857; US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/650,255, filed Feb. 8, 2022, Ser. No. 17/649,723, filed Feb. 2, 2022, Ser. No. 17/663,462, filed May 16, 2022, and/or International Application No. PCT/US2022/072238, filed May 11, 2022, and/or International Application No. PCT/US2022/070882, filed Mar. 1, 2022, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular alert system, the vehicular alert system comprising:

a microphone disposed at a vehicle equipped with the vehicular alert system and sensing exterior of the vehicle, the microphone capturing audio data;

an electronic control unit (ECU) comprising electronic circuitry and associated software;

wherein the electronic circuitry of the ECU comprises a processor for processing audio data captured by the microphone;

wherein the vehicular alert system, responsive to processing by the processor of audio data captured by the microphone, determines an audio event occurring external of the vehicle, and wherein the vehicular alert system determines the audio event occurring external of the vehicle based at least in part on the audio event having a volume that exceeds a volume threshold;

wherein the vehicular alert system, responsive to determination of the audio event occurring external of the vehicle, debounces the audio event for a predetermined period of time;

wherein the vehicular alert system is operable to determine whether the audio event is still occurring after the predetermined period of time;

wherein the vehicular alert system, responsive to determination that the audio event is still occurring after the predetermined period of time, generates an alert for an occupant of the vehicle, and wherein the vehicular alert system does not generate the alert before the predetermined period of time elapses;

wherein the alert comprises vibration of a seat of the vehicle; and wherein the alert comprises a visual alert at a display screen disposed within the vehicle and viewable by a driver of the vehicle, and wherein the visual alert indicates direction toward the determined audio event.

2. The vehicular alert system of claim 1, wherein the microphone comprises a plurality of microphones.

3. The vehicular alert system of claim 2, wherein the plurality of microphones comprises two microphones.

4. The vehicular alert system of claim 3, wherein the two microphones comprises a first microphone disposed at a front portion of the vehicle and a second microphone disposed at a rear portion of the vehicle.

5. The vehicular alert system of claim 2, wherein the vehicular alert system determines the direction of the determined audio event based on differences between audio data captured by a first microphone of the plurality of microphones and audio data captured by a second microphone of the plurality of microphones.

6. The vehicular alert system of claim 1, wherein the determined audio event comprises at least one selected from the group consisting of (i) a siren and (ii) a vehicle horn.

7. The vehicular alert system of claim 1, wherein the predetermined period of time is at least one second.

8. The vehicular alert system of claim 1, wherein the visual alert comprises a graphic overlay at the display screen.

9. The vehicular alert system of claim 8, wherein the graphic overlay comprises an arrow pointing in the direction toward the determined audio event.

10. The vehicular alert system of claim 1, wherein the vehicular alert system, responsive to determination of the audio event occurring external of the vehicle, reduces a volume of an entertainment system of the vehicle.

11. The vehicular alert system of claim 10, wherein the alert comprises an audible alert.

12. The vehicular alert system of claim 1, wherein the vehicular alert system confirms the audio event occurring external of the vehicle based on image data captured by a camera of the vehicular alert system.

* * * * *